United States Patent
Rodriguez et al.

(10) Patent No.: US 11,529,804 B2
(45) Date of Patent: Dec. 20, 2022

(54) INKJET PRINTING METHOD

(71) Applicant: Global Inkjet Systems Limited, Cambridge (GB)

(72) Inventors: Alberto Donado Rodriguez, Cambridge (GB); Damian Howard Laurence Smith, Cambridge (GB); Nicholas Campbell Geddes, Suffolk (GB)

(73) Assignee: Global Inkjet Systems Limited, Cambridge (GB)

( * ) Notice: Subject to any disclaimer, the term of this patent is extended or adjusted under 35 U.S.C. 154(b) by 129 days.

(21) Appl. No.: 17/052,636

(22) PCT Filed: May 10, 2019

(86) PCT No.: PCT/GB2019/051293
§ 371 (c)(1),
(2) Date: Nov. 3, 2020

(87) PCT Pub. No.: WO2019/220079
PCT Pub. Date: Nov. 21, 2019

(65) Prior Publication Data
US 2021/0237431 A1    Aug. 5, 2021

(30) Foreign Application Priority Data

May 15, 2018 (GB) .................................... 1807891

(51) Int. Cl.
*B41J 2/045* (2006.01)
*B41J 2/36* (2006.01)
*G06K 15/10* (2006.01)

(52) U.S. Cl.
CPC ....... *B41J 2/04503* (2013.01); *B41J 2/04508* (2013.01); *B41J 2/04573* (2013.01);
(Continued)

(58) Field of Classification Search
CPC ................ B41J 2/04503; B41J 2/04508; B41J 2/04573; B41J 2/04586; B41J 2/36; G06K 15/102
See application file for complete search history.

(56) References Cited

U.S. PATENT DOCUMENTS

| 4,216,480 A | 8/1980 | Buehner et al. |
| 4,686,540 A | 8/1987 | Leslie et al. |

(Continued)

FOREIGN PATENT DOCUMENTS

| EP | 0501487 A2 | 9/1992 |
| EP | 0945273 A2 | 9/1999 |

*Primary Examiner* — Thinh H Nguyen
(74) *Attorney, Agent, or Firm* — Quinn IP Law

(57) ABSTRACT

A printing system for printing images formed of pixels on a substrate, the system comprising a print system arranged where printheads traverse a substrate, the print system arranged to receive a sequence of print actuation requests in order to print each pixel of an image upon the substrate, the print system having an acceptable rate for the sequence of print actuation requests, the system configured whereby if presented with an actuation period of less than the minimum actuation period then the presented rate of print actuation requests is adjusted by altering the actuation event and/or the discarding of stripe data, to minimise print defects.

20 Claims, 1 Drawing Sheet

(52) U.S. Cl.
CPC ............ *B41J 2/04586* (2013.01); *B41J 2/36* (2013.01); *G06K 15/102* (2013.01)

(56) References Cited

U.S. PATENT DOCUMENTS

| | | |
|---|---|---|
| 5,816,719 A | 10/1998 | Palmer |
| 2002/0089560 A1 | 7/2002 | Katayama et al. |
| 2006/0082813 A1 | 4/2006 | Martin et al. |
| 2009/0109253 A1* | 4/2009 | Benjamin ............ B41J 2/04541 347/12 |
| 2010/0134549 A1 | 6/2010 | Barbour et al. |

* cited by examiner

INKJET PRINTING METHOD

TECHNICAL FIELD

This invention relates to inkjet printing and in particular relates to maintaining best print quality in printer operations where the relative speed of the printhead and printed substrate means that the actuation period necessary to maintain the desired spacing between printed pixels (pixel pitch), as indicated by the timing of received actuation requests, is less than the minimum actuation period of the printhead or print system.

BACKGROUND

Modern inkjet printheads commonly consist of an array of individually switched nozzles, each of which comprise an actuator that is arranged to eject ink from the nozzle when actuated. These actuators are driven by an electronic drive circuit which provides a voltage waveform or common drive signal (actuation event) that is configured to result in the ejection of ink from a nozzle. In many applications, the electronic drive circuit supplies a common drive signal to many nozzles, and a separate or integrated controller provides data switching to the printhead that determines which of the individual nozzles are to jet ink for a given instance of the actuation event. Data for a group of nozzles associated with a shared actuation event is called stripe data. For simplicity, we will consider control of a one-nozzle printhead such that one actuation event uses one pixel of stripe data to produce one pixel of printed image. However, the same process naturally generalises to a printhead of many hundreds or thousands of nozzles driven by one actuation event, or indeed many such printheads. Consequently, by arranging a coordinated sequence of drive signals and switching inputs, the printhead produces an image on a substrate in the form of pixels side-by-side as the printhead and substrate move relative to one another. This is applicable to, but not restricted to, single-pass printing, scanning printing, depositing items at target locations, or marking a surface using a laser or tool where the substrate may be flat, curved, or other geometric shape and could be formed of any material, including fluids. It may include, but is not limited to, graphics, text, a functional material, a coating or pre-treatment, etching or resistant chemicals, adhesive, and biological material.

It will be understood that to actuate an inkjet nozzle takes a certain amount of time and this is normally dependent upon the design of the drive signals. Most printheads have a minimum actuation period which the electronic drive circuit should not exceed. The electronic drive circuit may also have its own minimum actuation period. It will also be understood that it is normal for the substrate position and electronic drive circuit to be synchronised by way of an encoder or similar device that is monitoring the substrate position either directly or indirectly. The purpose of this synchronisation is to ensure that the actuation process and substrate motion are synchronised to achieve a desired relative pixel spacing (pixel pitch) regardless of variations in the substrate speed. If the substrate speed is such that the actuation period required to achieve desired pixel pitch is less than the minimum actuation period, then there is conflict between the desired pixel pitch and that which is possible for operation of the printhead and electronic drive circuit.

Ideally, it should be possible to ameliorate image quality when a print system receives actuation requests demanding a period of less than the minimum actuation period (over-driven) to maintain desired pixel pitch yet cannot be due to restrictions in the inkjet printhead minimum actuation period or the minimum drive actuation period of the electronic drive circuit. Such overdriving is typically a result of the relative speed of the printhead and substrate being too fast due to variations or inaccuracies in the print speed control, however may also be attributed to operational errors such as operators specifying too high a speed of motion, vibration caused by sensor jitter, or artefacts in encoder processing, which, in turn, means the print system is being requested to be driven too fast.

It is the purpose of this invention to provide a system and a method to minimise loss of print quality where such situation occurs.

SUMMARY

Accordingly, a first independent aspect of the present invention provides a print system for receiving actuation requests having an arrangement of print nozzles driven by a succession of actuation events with a need for a minimum actuation period between the actuation events, the arrangement including means to queue actuation requests and means to monitor the queue such that if the queue becomes longer than a defined discard threshold then the arrangement is configured to discard actuation requests from the queue and discard some stripe data.

Accordingly, a second independent aspect of the present invention provides a method of operating a print system which receives actuation requests and stripe data having an arrangement of print nozzles driven by a succession of actuation events with a need for a minimum actuation period between the actuation events, the arrangement including means to queue actuation requests and means to monitor the queue such that if the queue becomes longer than a defined discard threshold then the arrangement is configured to discard actuation requests from the queue and discard some stripe data.

Other exemplary features of dependent aspects of the present invention are outlined in the dependent claims to claim 1 and the dependent claims to claim 16.

It will be appreciated that one solution to managing situations attempting to drive the print system below the minimum actuation period is to discard actuation requests and associated stripe data. Such discarding will result in a severe reduction in image density particularly in the body of the printed image (FIG. 4).

Note that if an actuation request is discarded, at some point stripe data must also be discarded, otherwise at the end of the printing process, there will be stripe data remaining unprinted, and the stripe data which is printed as pixels may be in the wrong physical location. Similarly, if stripe data is discarded, actuation requests must also be discarded or there will eventually be a request with no stripe data for it to process. This balancing process can be described as compensating.

By aspects of the present invention actuation requests are put in a queue until minimum actuation separation is satisfied to maintain pixel placement, and avoid gross image stretching. When the actuation request queue exceeds a discard threshold then one actuation request, and its associated stripe data, is discarded. In such circumstances, this means that when the relative printhead and substrate speed reduces to below the minimum actuation period again, the print will return to correct registration. This will minimise the visual impact in the area where minimum actuation period was not achievable, both in density and registration.

In some print systems it may be advantageous to return to nominal alignment rather than allowing a small offset, which is less than the discard threshold, to persist for a long time or distance. Accordingly, by other aspects of the present invention, if the actuation request queue (and therefore the printed offset) is delaying requests by a period of time greater than a configured "long-term queue depth discard threshold" for a period of time greater than a configured "long-term timeout discard threshold" then one actuation request and its associated stripe data is discarded. In such circumstances, this means that even if the substrate speed does not reduce to below the minimum actuation period, the print will return to correct registration. In some circumstances, the visual impact of the single discarded event will be outweighed by the correct long-term registration. Similarly, the configured "long-term queue depth discard threshold" could be replaced with reference to the request period, or in relation to the distance travelled, and the "long-term timeout discard threshold" could instead be configured in terms of distance along the print direction as a "long-term distance discard threshold".

Whilst the discard threshold may be provided in time or distance units, it will be appreciated that it is possible to allow for multiple sets of depths and times to be set. In an example, products of distance and times are also allowed such that, for example, 0.5 pixels for 1 second are equivalent to 0.25 pixels for 2 seconds.

BRIEF DESCRIPTION OF THE DRAWINGS

Aspects of the present invention will now be further described, by way of example only, with reference to the accompanying figures; in which—

DETAILED DESCRIPTION

Figure 1:
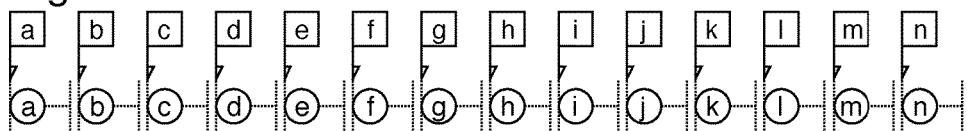
FIG. 1 provides a schematic illustration of a typical succession of pixels locations as results from an actuation request to a print system when not overdriven.

FIG. 1 is a schematic illustration of a typical succession of pixels as a result of print system actuation requests separated by more than the minimum actuation period. In such circumstances, each actuation event has time to produce pixels as deposits of fluid, such as ink, from driven nozzles of the printhead in regular even and spaced order on a print substrate such as paper, card, board or fabric. The print system in these conditions is working well within its desired limits so there is no slippage in pixel position due to the situations as described above. As can be seen, pixels 'a' to 'n' are all consistent and evenly spaced so a high-quality image will be achieved.

Figure 2:
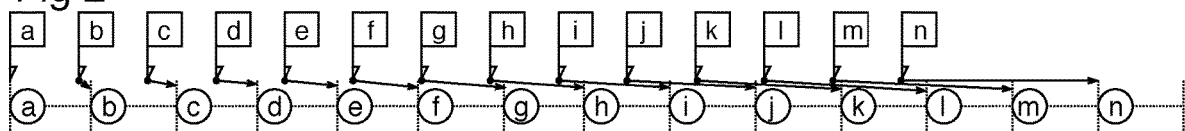
FIG. 2 provides a schematic illustration of a succession of shifted pixels locations as results from an actuation request to a print system when attempted to be overdriven.

FIG. 2 is a schematic illustration of a succession of actuation requests to a print system the pixels 'a' to 'n' are all progressively displaced. As the actuation requests are received closer than the minimum actuation period, subsequent actuation requests are queued, therefore actuation events are delayed, resulting in a shift in the pixel placement in the relative direction of travel between the printhead and substrate. As the actuation events may be delayed by different amounts for different printheads (for example where different printhead systems have different minimum actuation periods due to ink type, printhead design and type etc) there could also be a mismatch between different regions, or colours of the printed output. Within the body of the image it will be seen that for example pixels 'd' onward in FIG. 1 and FIG. 2 are significantly out of alignment. It will be appreciated that such misalignment will reduce the quality of the printed image and result in image artefacts such as the appearance of being stretched, reduced density and colour errors.

Figure 3:
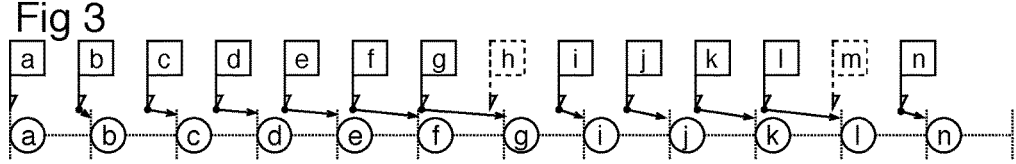
FIG. 3 provides an exaggerated succession of shifted pixel locations arranged in accordance with aspects of the present invention.
Figure 4:
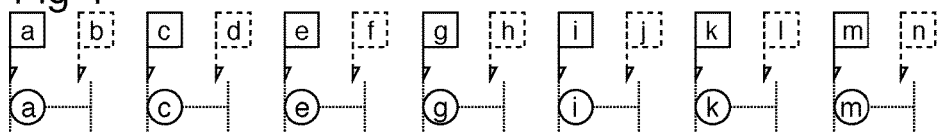
FIG. 4 provides a schematic illustration of discarding actuation requests and associated stripe data which cannot be immediately processed—resulting in a much lower print density (i.e. not using the present invention)
Figure 5:
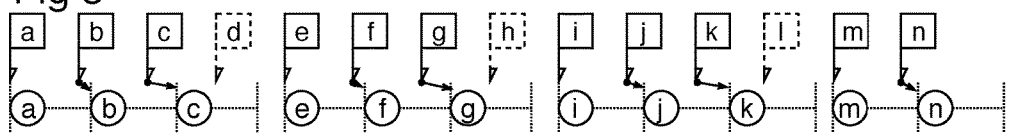
FIG. 5 provides a schematic illustration of a variant configuration of the present invention in which actuation requests and stripe data are discarded if they are delayed by a predetermined fraction of a pixel pitch, distance, or time period.

FIG. 3 provides a schematic illustration of pixels in accordance with aspects of the present invention. As can be seen in exaggerated form, over a much shorter than normal number of cycles initially, the pixels are displaced as previously discussed, when the printhead is attempted to be overdriven. However, in accordance with aspects of the present invention, when the actuation request period is less than the minimum actuation period by a set limiting factor or amount, a print actuation request along with its associated stripe data will be discarded or ignored. In the illustration this proportion is one whole minimum actuation period, as it is easy to identify and regulate. However, the set amount or factor (discard threshold), could be a fraction of a pixel pitch such ½ or ¼ of a pixel pitch, or a multiple of the pixel pitch, or a fraction or multiple of the minimum actuation period such as illustrated in FIG. 5. As can be seen in FIG. 3, as with FIG. 2, the pixels 'a' to 'g' gradually become askew such that by pixel 'g' there is more than a pixel pitch misalignment in comparison with the desired regular and even pixels of FIG. 1. In such circumstances stripe data 'h' and its actuation request is discarded so the next actuation event gives pixel 'i'. The actuation requests for the pixels are held in a queue whilst the print system is attempted to be overdriven and it is the actuation requests for pixels 'h' and 'm' which are discarded or ignored.

In an example, the means to queue actuation requests and means to monitor the queue are provided by way of a controller or respective control units.

Figure 6:
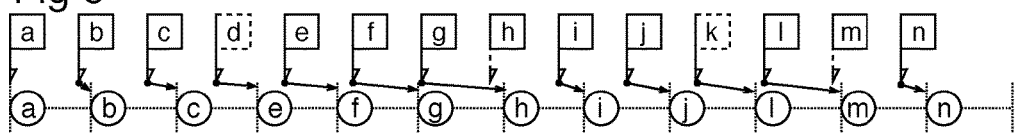
FIG. 6 provides a schematic illustration of another variant configuration of the present invention in which stripe data may be discarded separately from its own associated actuation request.

FIG. 6 describes aspects of the present invention which apply to systems which have pre-buffering of stripe data and the capability to process this pre-buffered stripe data. The present invention discards the stripe data associated with a single actuation request if the delay is too large, but maintains this actuation request in the queue. In this case, stripe data 'd' is discarded, but when the print system is able to process its queued actuation request, stripe data 'e' is brought forward and printed (as soon as 'c' is complete), in advance of its own actuation request. If an actuation request is received when there is already an actuation request in the queue, the actuation request is discarded, but no change is made to the stored stripe data. In this case, the request to print 'h' arrives while the actuation request originally for 'g' is still waiting. We discard the 'h' actuation request. When stripe data 'g' has finished executing, the queued actuation request is released, and causes 'h' to print. Now there are no queued events until actuation request 'i' arrives while 'h' is printing.

Figure 7:
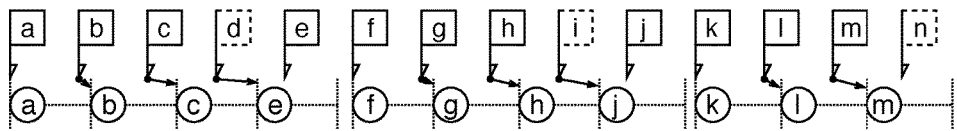
FIG. 7 provides a schematic illustration of yet another variant configuration of the present invention in which stripe data may be discarded separately from its associated actuation request.

FIG. 7 shows a variation of the invention as described in FIG. 6, but in which following the discarding of stripe data 'd', stripe data 'e' is actuated by actuation request 'd' and the subsequent actuation request 'e' is discarded.

Attempted overdriving of a print system may be temporary. When the print system begins to return to normal operation the print system may attempt to 'catch up' by actuating the queued request, as would be the case of FIG. 2. This would result in a region of increased image density.

A further aspect of the present invention also allows time for relief of the reason for attempted print system overdrive. If the attempted print system overdrive stops, and the overdrive limit is not exceeded, then it might be possible to avoid the need to discard actuation requests and stripe data. If the reasons for attempted overdrive is temporary then the limiting factor may never exceed the discard threshold, so the printed image may come back into registration, with only a slight distortion in the printed image. It will be appreciated that the discard threshold used as the limit to define operation of the procedure to discard actuation requests, will be determined by the necessary level to minimise print distortion and density reduction. Prints where accurate pixel placement is important will mean a low discard threshold, whilst printing in which coverage or density, or information in each pixel is more critical, may have a higher discard threshold.

The set amount for the discard threshold may be provided in time or distance units. In an example given in FIG. 5 as described above, this could be a fraction of a pixel pitch such ½ or ¼ of a pixel pitch, or a multiple of the pixel pitch, or a fraction or multiple of the minimum actuation period.

In another example, the defined threshold is a distance in the print direction. In a further example, the defined threshold is determined by a vision inspection device providing print quality feedback.

In a dependent aspect, the defined discard threshold must be exceeded for an amount of time. In other words, the predetermined discard threshold is set to be greater than a predetermined time interval. In an alternative dependent aspect, the defined discard threshold must be exceeded for a distance in the print direction. In other words, the defined discard threshold is greater than a predetermined distance in the print direction.

The present invention has many benefits to printing systems which are requested to be overdriven as follows:—
A) Limitation of the edge drift or fray;
B) Improved retaining of image density;
C) Resulting image size is retained close to the target image size;
D) Minimisation of registration mismatch between different printheads;
E) Minimisation of misalignment between passes when attempted overdriving a scanning printer (unidirectional or bidirectional);
F) Print machines may be run closer to theoretical maximum speed of printhead and electronics without fear of damaging these components or any significant loss of image quality, as temporary attempt to overdrive has a reduced impact as described above;
G) Prevention of high-density regions when attempted overdrive ceases and electronics try to 'catch up' with queued actuation requests; and
H) Improved recovery from temporary requested overdrive situation without the need to discard stripe data.

Printhead overdrive conditions as indicated above, can result from a number of situations, including the print substrate upon which the image is to be printed being driven faster than intended or the substrate is stretched due to differential driving of the substrate over an extended area. Typically, encoders can be used to track the position of the print media drive system. There are many ways in which a system might not regulate its speed properly. Aspects of the present invention aim to cope with these attempted overdrive situations due to any cause.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, and for the avoidance of doubt, an image in the context of the present invention describes a target arrangement of toner, ink, varnish or another substance on a substrate as produced by a print system, where the substrate may be flat, curved or other geometric shape and could be formed of any material, including fluids. It may include, but is not limited to, graphics, text, a functional material, a coating or pre-treatment, etching or resistant chemicals, adhesive, and biological material.

Although the description of the present examples assume evenly-spaced pixels (or other position-related event), it will be appreciated that the method is also applicable where the pitch varies.

The invention claimed is:

1. A print system for receiving actuation requests having an arrangement of print nozzles driven by a succession of actuation events with a need for a minimum actuation period between the actuation events, the arrangement including:
    a means to queue actuation requests so that an actuation event can continue to be performed after the minimum actuation period has occurred; and
    a means to monitor the queue such that if the queue becomes longer than a defined discard threshold then the arrangement is configured to discard actuation requests from the queue and discard some stripe data.

2. The print system as claimed in claim 1 wherein the actuation request is a combination of actuation request and associated stripe data.

3. The print system as claimed in claim 1 wherein the actuation request is separate to the associated stripe data.

4. The print system as claimed in claim 1 such that the stripe data discarded is the stripe data associated with its intended actuation request.

5. The print system as claimed in claim 1 wherein the discarding of the stripe data associated with an actuation request does not result in the discarding of the actuation request, but rather brings forward stripe data associated with a future actuation request.

6. The print system as claimed in claim 5 wherein the future actuation request is discarded to compensate for discarding stripe data that was associated with an earlier actuation request.

7. The print system as claimed in claim 1 wherein the defined discard threshold is equivalent to, smaller than, or greater than one pixel pitch.

8. The print system as claimed in claim 1 wherein the defined discard threshold is equivalent to, smaller than, or greater than one minimum actuation period.

9. A print system as claimed in claim 1 wherein the defined discard threshold is a distance in the print direction.

10. A print system as claimed in claim 1 wherein the defined discard threshold is determined by a vision inspection device providing print quality feedback.

11. A print system as claimed in claim 1 wherein, if the defined discard threshold is not reached, actuation requests and stripe data are not discarded.

12. A method of operating a print system which receives actuation requests and stripe data having an arrangement of print nozzles driven by a succession of actuation events with a need for a minimum actuation period between the actuation events, the arrangement including:
- a means to queue actuation requests so that an actuation event can continue to be performed after the minimum actuation period has occurred; and
- a means to monitor the queue such that if the queue becomes longer than a defined discard threshold then the arrangement is configured to discard actuation requests from the queue and discard some stripe data.

13. The method as claimed in claim 12 wherein the actuation request is a combination of actuation request and associated stripe data.

14. The method as claimed in claim 12 wherein the actuation request is separate to the associated stripe data.

15. The method as claimed in claim 12 such that the stripe data discarded is the stripe data associated with its intended actuation request.

16. The method as claimed in claim 12 wherein the discarding of the stripe data associated with an actuation request does not result in the discarding of the actuation request, but rather brings forward data associated with a future actuation request.

17. The method as claimed in claim 16 wherein the future actuation request is discarded to compensate for discarding data that was associated with an earlier actuation request.

18. The method as claimed in claim 12 wherein the defined discard threshold is equivalent to, smaller than or greater than one pixel pitch.

19. The method as claimed in claim 12 wherein the defined discard threshold is equivalent to, smaller than, or greater than one minimum actuation period.

20. The method as claimed in claim 12 wherein the defined threshold is a distance in the print direction or is determined by a vision inspection device providing print quality feedback.

* * * * *